United States Patent [19]

Ueki et al.

[11] 4,413,291
[45] Nov. 1, 1983

[54] CASSETTE TAPE PLAYER-RECORDER

[75] Inventors: Yoshiharu Ueki; Shouzaburou Sakaguchi, both of Kawagoe, Japan

[73] Assignee: Pioneer Electronic Corporation, Tokyo, Japan

[21] Appl. No.: 306,399

[22] Filed: Sep. 28, 1981

[30] Foreign Application Priority Data

Sep. 29, 1980 [JP] Japan ............................ 55-135617

[51] Int. Cl.³ ............................................ G11B 15/00
[52] U.S. Cl. ...................................... 360/71; 360/93; 360/137
[58] Field of Search ................. 360/71, 93, 96.5–96.6, 360/105, 137

[56] References Cited

U.S. PATENT DOCUMENTS 3,765,685 10/1973 Harlan et al. ..................... 242/198
3,932,889 1/1976 Takeda et al. ..................... 360/71

*Primary Examiner*—John H. Wolff
*Attorney, Agent, or Firm*—Fleit, Jacobson, Cohn & Price

[57] ABSTRACT

A cassette tape player-recorder of slot-in type which includes first detecting means for detecting the insertion of cassette into the slot, second detecting means for detecting correct placement of the inserted cassette at the operable position, a reset signal generator for producing a reset signal when a time longer than a predetermined period lapses from the insertion of the cassette into the slot until the correct positioning of the cassette at the operable position, and a cassette eject controller for ejecting the cassette in response to the reset signal. The cassette tape player-recorder can avoid malfunction thereof and damage of the cassette.

4 Claims, 2 Drawing Figures

CASSETTE TAPE PLAYER-RECORDER

FIELD OF THE INVENTION

The present invention relates, in general, to a magnetic tape player-recorder and, in particular, to a cassette tape player-recorder of so called slot-in type.

BACKGROUND OF THE INVENTION

The cassette tape player-recorder of slot-in type includes a cassette receiveing tunnel communicated with a cassette insertion slot formed in the housing thereof. In the cassette receiving tunnel, a carriage is movably provided which receives and carries thereon a cassette inserted into the cassette receiving tunnel through the cassette insertion slot. The carriage is adapted to automatically position the cassette at an operable position when the cassette is inserted into the tunnel and to place the cassette at an inoperative position or eject out of the tunnel when an eject mechanism operates.

In such cassette tape player-recorder of slot-in type, it is difficult for the operator to observe whether a cassette inserted into the tunnel is correctly placed at the operative position or not. Thus, it sometimes occurs that the cassette tape is advanced for play-back, recording or other mode of operation even when the cassette is not correctly placed at the operative position thereby to invite breakage of the tape, unusual rotation of the reels in the cassette, damage of the cassette casing etc.

SUMMARY OF THE INVENTION

The present invention contemplates elimination of such a drawback in a cassette tape player-recorder of slot-in type as mentioned above and it is, accordingly, a primary object of the present invention to provide an improved cassette tape player-recorder of slot-in type in which an eject mechanism actuates to eject a cassette from the tunnel when the cassette cannot be placed at the operable position during a predetermined time period from the insertion of the cassette into the tunnel.

In accordance with the present invention, such an object of the invention is accomplished basically in a cassette tape player-recorder of slot-in type which comprises, in combination, a cassette receiving tunnel opened to outside through a cassette insertion slot, a carriage movable in the cassette receiving tunnel for holding therein a cassette inserted into the tunnel and for positioning the cassette at an operable or inoperable position, a tape advancing mechanism for advancing a recording tape contained in the cassette when the cassette is placed at the operation position, a head positioning mechanism for positioning a magnetic head relative to the recording tape, and a controller for controllong the tape advancing and head positioning mechanisms thereby to perform predetermined modes of operation, and which is characterized by first detecting means placed within the cassette receiving tunnel, for detecting the insertion of the cassette into the tunnel, second detecting means for detecting that the cassette is placed at the operable position, a reset signal generator connected to the first and second detecting means, for producing a reset signal when a time longer than a predetermined period lapses from the insertion of the cassette into the tunnel until the cassette is placed at the operable position, and a cassette eject controller connected to said carriage, for ejecting the cassette in response to the reset signal.

BRIEF DESCRIPTION OF THE DRAWINGS

The features and advantages of a cassette tape player-recorder of slot-in type proposed by the present invention will be more clearly understood from the following description taken in conjunction with the accompanying drawings, in which.

DETAILED DESCRIPTION OF THE EMBODIMENT

Figure 1:
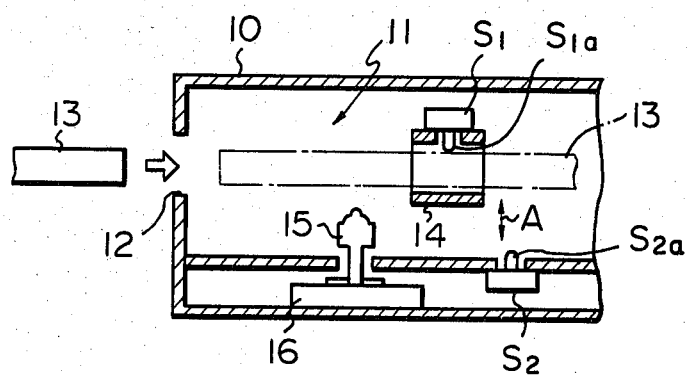
FIG. 1 a sectional view, taken in part, of a cassette tape player-recorder of slot-in type according to the present invention.

Referring to the drawings, espetially to FIG. 1, there is shown a part of a cassette tape player-recorder according to the present invention which comprises a housing 10 in which a cassette receiving tunnel 11 is formed. The cassette receiving tunnel 11 is opened to outside of the housing 10 through a cassette insertion slot 12 formed at a suitable portion of the housing 10. A cassette 13 which is to be set in the player-recorder is inserted through the slot 12 into the tunnel 11 and is received by a carriage 14 which is movably provided in the tunnel 11. A mechanical switch $S_1$ so as to detect the insertion of the cassette 13 into the tunnel 11. The mechanical switch $S_1$ is, in this embodiment, mounted on the carriage 14 and is actuated via its armature $S_{1a}$ when the cassette 13 is held by the carriage 14. The carriage 14 is adapted to hold therein the inserted cassette 13 and is automatically moved by a control mechanism (not shown) upwardly or downwardly as shown by an arrow A so as to place the cassette 13 from an inoperable position (upper position in FIG. 1) to an operable position (lower position in FIG. 1) and vice versa. When the cassette 13 is placed at the operable position, the reels (not shown) of the cassette 13 are engaged with reel drive shaft 15 which are driven directly or through a suitable mechanism by a motor 16 placed at the lower position of the housing 10. At the same time, the cassette 13 abuts with an armature $S_{2a}$ of a mechanical switch $S_2$ mounted on an suitable portion of the housing 10 so that the mechanical switch $S_2$ is actuated.

It is to be understood that the mechanical switches $S_1$ and $S_2$ may be replaced by photo-couplers for detecting the positions of the cassette 13, if preferred.

Even being not shown in FIG. 1, the cassette tape player-recorder according to the present invention includes usual recording tape treating mechanisms such as a tape advancing mechanism a head positioning mechanism and an ejecting mechanism. The tape advancing mechanism is adapted to advance a recording tape in the cassette 13 placed at the operable position. The head positioning mechanism is adapted to position a magnetic head (not shown) with respect to the recording tape so as to perform play-back or recording mode of operation.

Various constructions of such cassette tape player-recorder of slot-in type are known in the art and are, for example, disclosed in U.S. Pat. Nos. 3,765,685 and 3,932,889.

Figure 2:
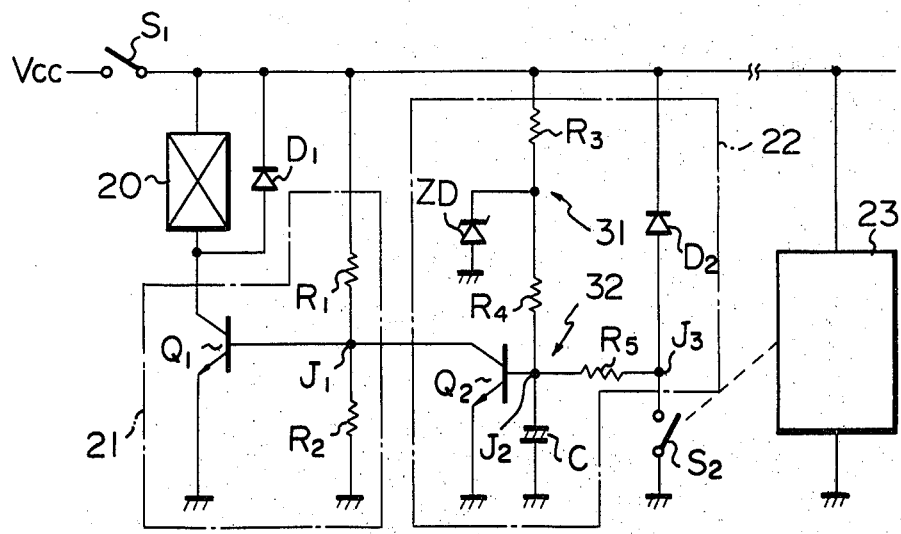
FIG. 2 is a circuit diagram of a control circuit incorporated in the cassette tape player-recorder of FIG. 1.

The player-recorder shown in FIG. 1 is to be incorporated with a controller shown in FIG. 2. The controller includes a holding solenoid 20 which attracts a lock arm (not shown) so that the lock arm makes the eject mechanism to hold the carriage 14 at the operable position as long as the holding solenoid 20 is energized.

When the holding solenoid 20 is de-energized the carriage 14 moves so that the cassette 13 moves to the inoperable position and further the cassette 13 is ejected from the tunnel 11. The holding solenoid 20 is energized by a drive circuit 21 when the switch $S_1$ is closed. The switch $S_1$ is used as a power-on switch for supplying a voltage Vcc to the succeeding stages, in this embodiment. The holding solenoid 20 is bypassed by a diode $D_1$ which absorbs the counter electromotive force generated in the solenoid 20 upon de-energization thereof. The drive circuit 21 includes a transistor $Q_1$ having the collector thereof connected to the solenoid 20 and the emitter thereof grounded. The base of the transistor $Q_1$ is connected to a dividing point $J_1$ of a voltage dividing circuit constituted by two resistors $R_1$ and $R_2$. The voltage dividing circuit is supplied with the voltage Vcc through the switch $S_1$ and supplies with a divided voltage to the base of the transistor $Q_1$ whereby the transistor $Q_1$ becomes conductive and causes to energize the solenoid 20. The voltage Vcc through the switch $S_1$ is further supplied to a reset signal generating circuit 22 which includes a voltage regulating circuit 31 constituted by a resistor $R_3$ and a zenor diode ZD. A regulated voltage from the regulating circuit 31 is supplied to a time-constant circuit 32 which is constituted by a resistor $R_4$ and a charging capacitor C. The reset signal generating circuit 22 further includes a transistor $Q_2$ acting as a switching element for producing a reset signal when it is triggered. The transistor $Q_2$ is triggered and becomes conductive when the voltage appearing at a joint $J_2$ between the charging capacitor C and the resistor $R_4$. A discharging circuit is provided between the joint $J_2$ and the power bus line connected through the switch $S_1$ to the voltage source. The discharging circuit is constituted by a resistor $R_5$ and a diode $D_2$ and acts to discharge the charging capacitor C when the switch $S_1$ become OFF. The switch $S_2$ is connected to a joint $J_3$ between the resistor $R_5$ and the diode $D_2$ whereby the capacitor C is discharged upon closure of the switch $S_2$ so as not to produce the reset signal. A controller 23 is supplied with the voltage Vcc through the switch $S_1$. The controller 23 is adapted to control the tape advancing mechanism, the head positioning mechanism, etc. so as to perform various modes of operation such as play-back (PLAY), record (REC), rewind (REW), and fast feed (FF) in accordance with manual indications or mechanical automatic indications.

It is now to be noted that the voltage regulating circuit 31 may be omitted when the voltage Vcc is regulated well.

When, is operation, the cassette 13 is inserted through the slot 12 into the carriage 14, the mechanical switch $S_1$ is actuated to close its circuit, so that the transistor $Q_1$ becomes conductive and the solenoid 20 is energized whereby the carriage 14 holds the cassette 13 and places the cassette 13 at the operable position. Then, the mechanical switch $S_2$ is actuated to close its circuit whereby the capacitor C is discharged through the resistor $R_5$. Accordingly, the reset signal generator 22 does not produce the reset signal and the controller 23 can operate so as to perform various modes of operation. It is now to be understood that the controller 23 may be constructed to initiate its functions in response to the actuation of the switch $S_2$.

When, in this instance, the cassette 13 cannot be placed at the operable position due to incorrect insertion thereof, trouble in the mechanism connected to the carriage, or the like, the mechanical switch $S_2$ is not actuated so that the charging caparicor C is charged up and the voltage across the capacitor C exceeds the predetermined level and the transistor $Q_2$ becomes conductive whereby the transistor $Q_1$ becomes non-conductive and the solenoid 20 is de-energized. Then, the cassette 13 is ejected from the tunnel 11 so that the switch $S_1$ becomes OFF and the controller 23 and the reset signal generating circuit 22 are both de-energized whereby the mulfunction of the player-recorder can be avoided.

It is now to be noted that although the reset signal from the reset signal generator 22 is used for de-energization of the solenoid in the above embodiment the reset signal may be used as the so-called shut-off signal or an alarm signal if preferred.

It is now to be understood that the cassette tape player-recorder according to the present invention can avoid mulfunction thereof or damage of the cassette inserted therein even when the cassette is not correctly placed at the operable position.

It will be understood that the invention is not to be limited to the exact construction shown and described and that various changes and modifications may be made without departing from the spirit and scope of the invention as defined in the appended claims.

What is claimed is:

1. In a cassette tape player-recorder of slot-in type which includes a cassette receiving tunnel opened through a cassette insertion slot to the outside, a carriage movable in said tunnel for carrying a cassette inserted into said tunnel through said cassette insertion slot, a carriage control mechanism connected to said carriage for actuating said carriage so as to position said cassette at an operable or inoperable position, a tape advancing mechanism for advancing a recording tape contained in said cassette when said cassette is placed at said operable position, a head positioning mechanism for positioning a magnetic head relative to said recording tape, and a controller for controlling said tape advancing and head positioning mechanisms so as to perform predetermined modes of operation, the improvement comprises:

first detecting means placed within said cassette receiving tunnel, for detecting the insertion of a cassette into said tunnel;

second detecting means for detecting that said cassette is placed at said operable position;

a reset signal generator connected to said first and second detecting means, for producing a reset signal when a time longer than a predetermined period lapses from the insertion of said cassette into said tunnel until said cassette is positioned at said operable position;

a cassette eject controller connected to said carriage control mechanism for ejecting said cassette in response to said reset signal.

2. The improvement as defined in claim 1, in which said first detecting means includes a first mechanical switch positioned in the vicinity of said carriage and adapted to actuate when said cassette is inserted into said cassette receiving tunnel.

3. The improvement as defined in claim 1, in which said second detecting means includes a second mechanical switch so positioned as to actuate when said cassette is positioned at said operable position.

4. The improvement as defined in claim 1, in which said reset signal generator includes a charging capacitor a charging circuit for charging said capacitor as long as said first mechanical switch is actuated, a discharging circuit said chaging capacitor when said secon mechanical switch is actuated, and a switching element for producing said reset signal when a voltage across said charging capacitor exceeds a predetermined level.

* * * * *